Sept. 26, 1961 H. Y. MAGEOCH 3,002,059

DISTRIBUTED CONTACT SYSTEM

Filed April 9, 1958 4 Sheets-Sheet 1

INVENTOR.

HARRY YALE MAGEOCH

BY L. Edelson

ATTORNEY

Sept. 26, 1961 H. Y. MAGEOCH 3,002,059

DISTRIBUTED CONTACT SYSTEM

Filed April 9, 1958 4 Sheets-Sheet 2

INVENTOR.
HARRY YALE MAGEOCH
BY L. Edelson
ATTORNEY

Sept. 26, 1961 H. Y. MAGEOCH 3,002,059

DISTRIBUTED CONTACT SYSTEM

Filed April 9, 1958 4 Sheets-Sheet 3

INVENTOR.

HARRY YALE MAGEOCH

BY [signature]

ATTORNEY

Sept. 26, 1961 H. Y. MAGEOCH 3,002,059

DISTRIBUTED CONTACT SYSTEM

Filed April 9, 1958 4 Sheets-Sheet 4

INVENTOR.

HARRY YALE MAGEOCH

BY Leon Edelson

ATTORNEY 3,002,059
Patented Sept. 26, 1961

1

3,002,059

DISTRIBUTED CONTACT SYSTEM

Harry Yale Mageoch, Havertown, Pa., assignor, by mesne assignments, to H. K. Porter Company, Inc., Pittsburgh, Pa., a corporation of Delaware Filed Apr. 9, 1958, Ser. No. 727,328
9 Claims. (Cl. 191—6)

This invention relates to power distribution systems, and more particularly to the type of power distribution system known as a distributed contact system. Power distribution systems of the type to be described hereinafter may find a wide variety of applications, for example, in industrial plants, steel mills, ship yards, and in fact in any application where the free movement of machinery and materials or personnel is a requirement coupled with the desirability of a high degree of safety.

In the past many systems for high power distribution have been employed with varying degrees of success insofar as the safety aspect is concerned. For example, these conventional systems commonly employ a plurality of metal rails suitable for carrying heavy currents to operate large utility devices such as cranes. Additionally, these systems utilize high voltages, for example in the range of 400 to 4,000 volts, and consequently present an extreme safety hazard to any personnel in the vicinity of these rails. In an effort to lessen the danger of electrocution to personnel, various systems of installation have been evolved. Among the methods commonly employed are elevation substantially above ground level, burying of the conductors, and the surrounding of the conductors with protective sheathings of one form or another. All of the foregoing systems pose serious difficulties when it is desired that the utility to be operated from the power distribution system be maintained in electrical contact with the current carrying conductors for any appreciable distance, since necessarily the conductors of the distribution systems must be exposed. While the methods of power conductor elevation and installation below ground level provide a fair degree of safety together with the ability to move material and personnel at ground level with relative freedom, they are generally subject to other types of shortcomings. Exposed conductor systems, whether elevated or installed below ground level are subject to attack by corrosive atmospheres which makes them unsuitable for use in many applications. Moreover, they frequently present expensive maintenance problems; however, safetywise, the foregoing briefly described systems are superior to the very widely employed system of power distribution in which the power conductors are located at substantially ground level. In this system the power conductors are usually sheathed by guard boards which are located in such a fashion that they serve as a barrier between the live conductors and personnel in the area. Of course, an opening must be provided so that the current collectors associated with the utility to be operated may contact the current conductor rails, and if suitable care is not therefore exercised on the part of personnel they may contact the conductors and receive a serious shock. In addition to this safety hazard the location of the conductor rails at substantially ground level establishes barriers to the free passage of material and personnel throughout the area.

The system to be described herein differs from the conventional power distribution system in that while the conventional systems utilize conductor rails for carrying current around the service area to energize various utilities by means of a trolley or contact shoe mounted on the utility, the system according to the invention to be described operates in the reverse fashion. That is, power is distributed via buried cables to a series of spaced power

2 posts. At each post power may be delivered to a plurality of contact shoes mounted on the exterior of the post. The utility to be operated has mounted upon it a plurality of current collector rails adapted for engagement with the shoes mounted on the exterior of the posts and by reason of which the utility may be energized. As will become clear from an examination of the detailed specification which follows a high degree of safety is embodied in such a system because it is possible to maintain all of the power posts except those actively engaged in supplying power to a utility in a completely deenergized state. This is in fact one of the many advantages of my invention. Accordingly, it is a principal object of my invention to provide a system of power distribution which provides a maximum of safety to personnel without requiring complicated and inefficient guard systems or imposing any requirement for elevating the distributing conductors or installing them in inaccessible locations.

Another object of my invention is to provide a system of power distribution capable of operating in corrosive atmospheres and in other hostile environments where rail or wire systems fail.

Another object of my invention is to provide a power distribution system which allows for unobstructed movement of personnel and material within the service area of the power distribution system.

Still another object of my invention is to provide a power distribution system which is characterized by better regulation than can be afforded by any alternating current system and equal to that available from a direct current system.

Yet another object of my invention is to provide a power distribution system on which maintenance work may be carried out without interrupting equipment operation and which is inherently simple to install.

Other objects and advantages of my invention will become apparent from a reading of the following specification in conjunction with the several figures wherein.

FIGURE 4, consisting of FIGURE 4A and FIGURES 4B through 4E illustrates respectively the electrical schematic diagram of a power post in both an energized and deenergized condition, and the method of energizing and deenergizing the power posts through the agency of the conductor rails mounted on a utility.

FIGURE 5, consisting of FIGURE 5A and FIGURES 5B through 5F are analogous to the showings of FIGURE 4A through 4E except that the showings of FIGURE 5 illustrate a system in which the posts are grounded when not energized.

Figure 5A:
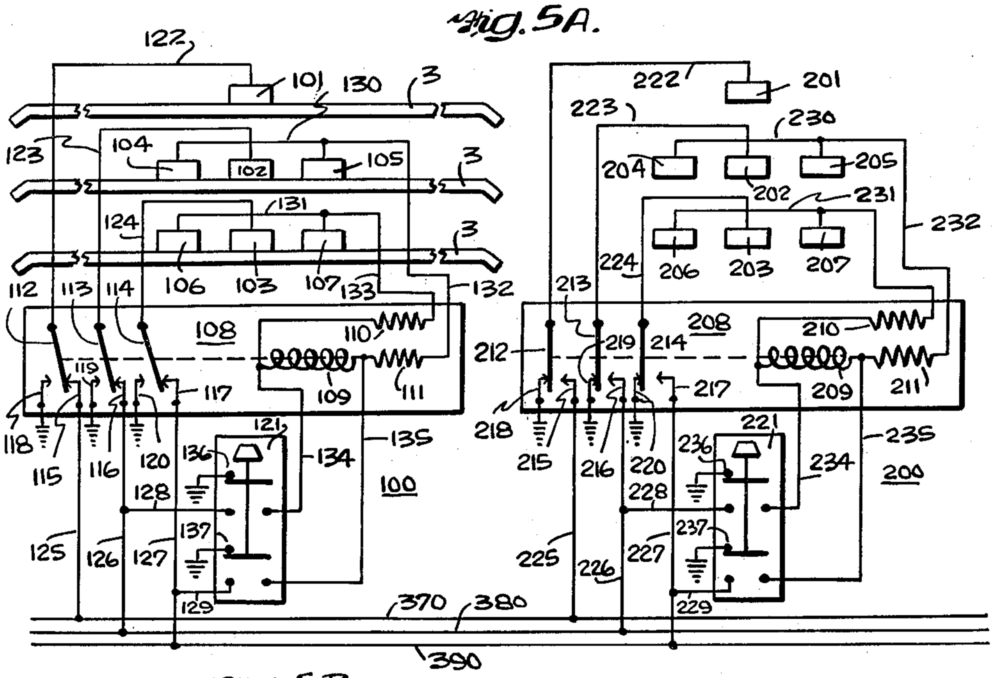
Figure 5B:
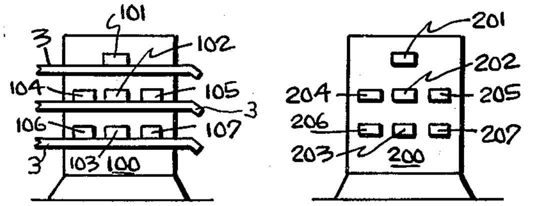
Figure 5C:
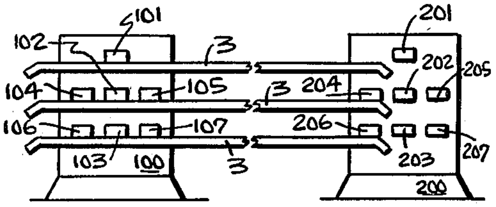
Figure 5D:
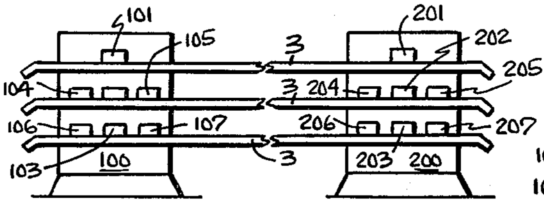
Figure 5E:
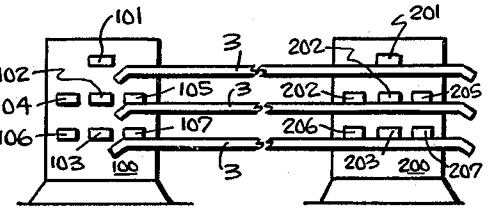
Figure 5F:
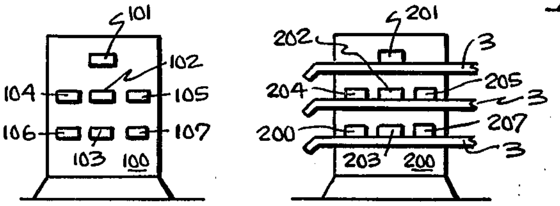
Figure 6:
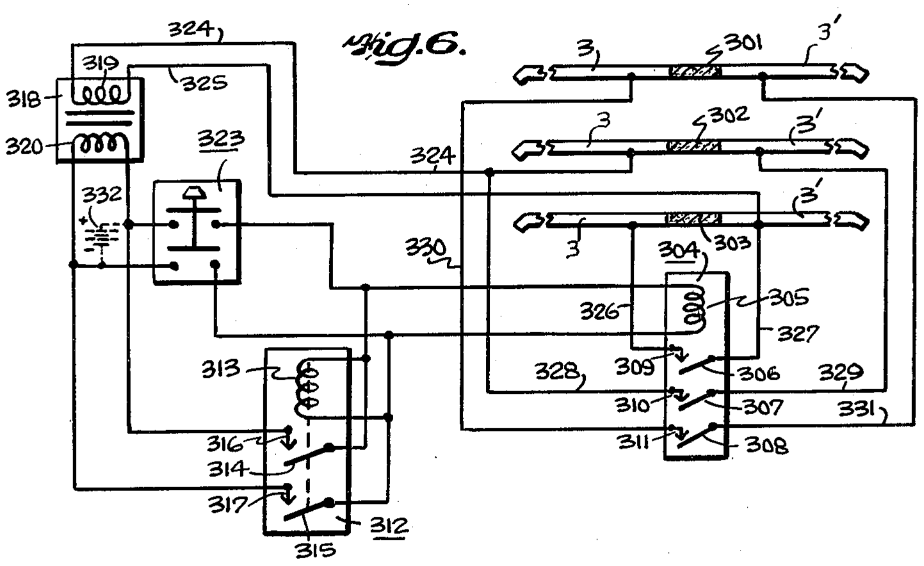

FIGURE 6 illustrates a control circuit which is required for use with the system of FIGURE 5.

Figure 7:
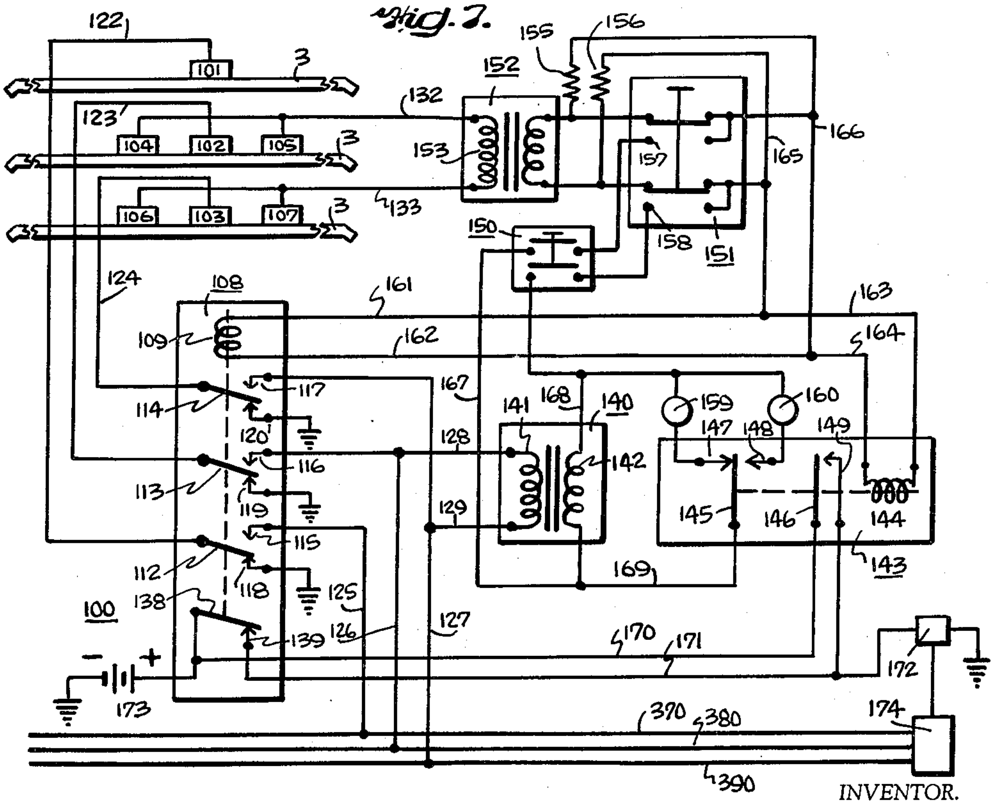

FIGURE 7 illustrates a control circuit also utilized in connection with the circuit of FIGURE 5.

In the several figures like elements are denoted by like numerals.

Figures 1, 2, 3:
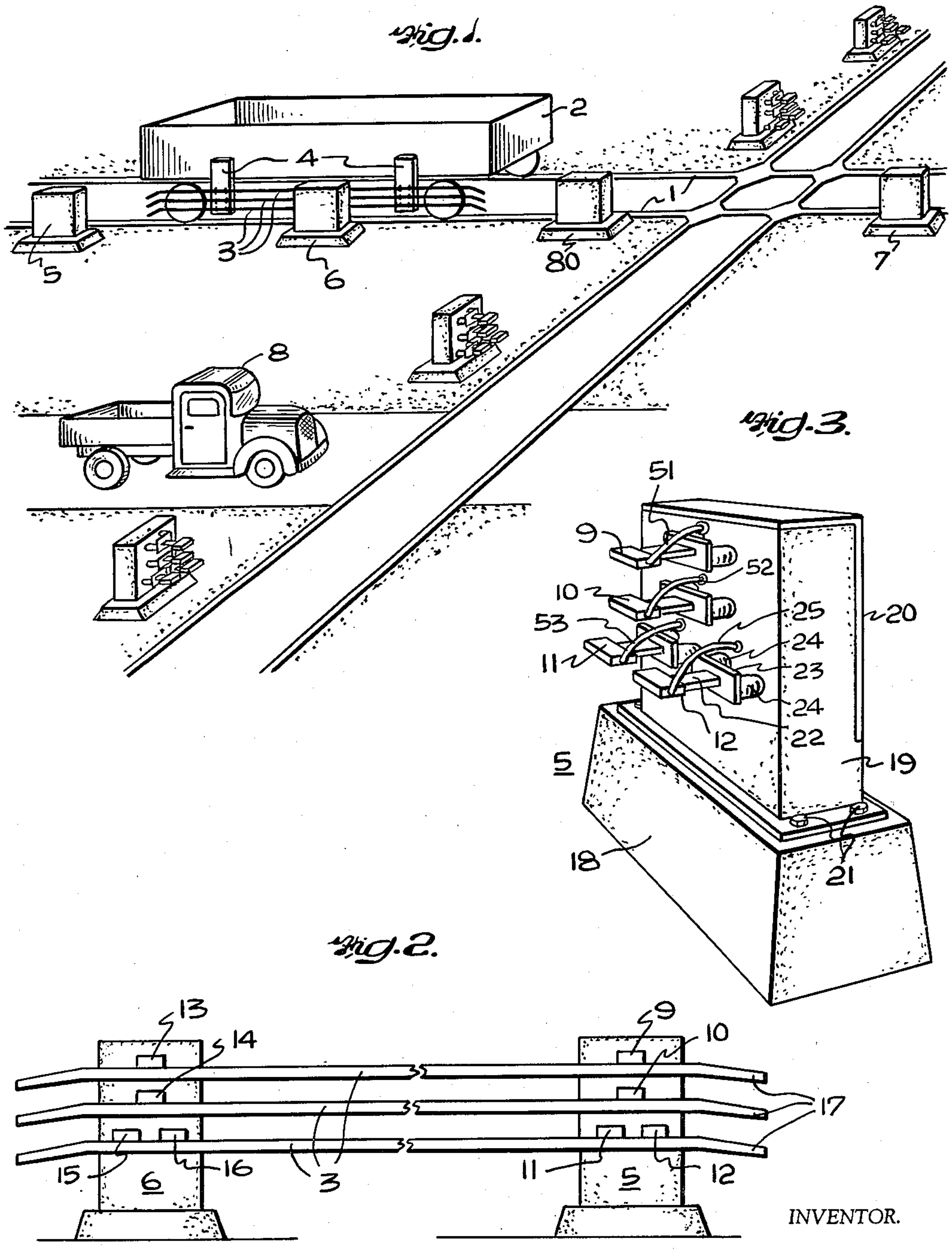
FIGURE 1 is a pictorial representation of an installed distributed contact power system showing the typical location of power posts and the freedom of movement provided thereby.
FIGURE 2 illustrates a plurality of conductor rails which may be mounted on a utility in engagement with a pair of power posts.
FIGURE 3 illustrates a perspective view of a typical power post.

Referring now to FIGURES 1, 2, and 3, but primarily and principally to FIGURE 1, there are shown a set of tracks 1 set into the floor of a service area and upon which a wheeled vehicle 2 is adapted to ride. The wheeled vehicle 2 is adapted to carry an electrically energizable utility which may be for example a crane or a hoist of some sort. In order to supply energy to the utility, the wheeled vehicle 2 has mounted on one side thereof a plurality of rails 3 which are affixed to the wheeled vehicle 2 by insulating standoffs 4 in such a fashion as to mechanically engage the contact shoes of the power post 6, which are not visible but which will be described in connection with FIGURES 2 and 3. The utility (not shown) carried by the wheeled vehicle 2 is electrically connected to the rails 3 by a cable or buss system (also not shown). During operation of the system the wheeled vehicle 2 may be driven along the tracks 1 by any convenient motive power such as some form of internal combustion engine, or an electrical driving system may be employed which may draw energization through the rails 3 from the power posts in the same way that the utility itself is so energized. It will be observed that as the wheeled vehicle 2 moves along the tracks 1 with the rails 3 in sliding contact with the power shoes mounted on the power post 6 it may approach the power post 80. In fact, as will be seen from the showing of FIGURE 2 the rails 3 are of sufficient length to bridge the distance between a pair of adjacent power posts, such as posts 6 and 80, and in fact at some point of its progress the rails 3 will engage contact shoes on both of the power posts 6 and 80 simultaneously. Such a showing is illustrated in FIGURE 2. When this occurs, power post 80 which is normally deenergized will become energized and both of the power posts 6 and 80 will supply current to the load carried by the wheeled vehicle 2. If the wheeled vehicle 2 should continue motion in the same direction as for example continuing in motion toward the power post 7, at a certain point in its progress the rails 3 will become disengaged from the contact shoes on the power post 6 and will then be in engagement only with the contact shoes on the power post 80, which will therefore supply the entire load current to the utility mounted in the wheeled vehicle 2. When this occurs the contact shoes mounted on the power post 6 will automatically become deenergized. In like fashion the vehicle 2 may move along the tracks 1 and the rails 3 will thereby engage the contact shoes of successive power posts. Only those power posts whose contact shoes are engaged by the rails 3 mounted on the wheeled vehicle 2 will be in energized state, all other power posts not so engaged being deenergized. It will be thus observed that a power distribution system of the type illustrated in FIGURE 1 leaves the service area relatively free of obstruction, and personnel and vehicles, for example vehicle 8, are provided with unimpeded motion within the service area.

Referring now to FIGURE 2 a pair of power posts 5 and 6 are shown, each having mounted thereon four contact shoes. Three of the contact shoes on each of the power posts 5 and 6 are designated as power shoes, and these are respectively the contact shoes 9, 10, and 11, on post 5 and 13, 14, and 15, on post 6. Three power shoes are designated since the system illustrated and that to be described in the subsequent figures relates to a three phase alternating current power distribution system, although my invention is not limited to such and is applicable also to single phase and two phase systems as well. The contact shoes 12 and 16 on the power posts 5 and 6 repectively are designated as control shoes and these are not engaged in actively delivering current to the load. The function of all of the contact shoes will become subsequently clear as the distribution system is described in connection with the subsequent figures. It will be further observed that the collector current rails 3 bridge between corresponding shoes on the adjacent posts. For example, the upper rail 3 bridges between the contact shoes 9 and 13 on the adjacent posts 5 and 6; the middle rail bridging between the contact shoes 10 and 14; and the lower rail bridging between the contact shoes 11, 12, and 15, 16. The spacing between a pair of adjacent power posts is obviously fixed by the length of the rails 3, and the longer these rails the wider the post-to-post spacing may be. Wide post spacing permits a decrease in the number of power posts required along any given track length with a consequent reduction in the cost of an installed system by virtue of the minimization of the amount of equipment required therefor.

The end sections 17 of the conductor rails 3 are inclined at an angle below the horizontal so that as the rails 3 approach a given power post, the end sections will slide underneath the contact shoes until the main horizontally extending sections gently engage the shoes. If the end sections of the rails 3 were not so tapered it is obvious that, rather than sliding under the contact shoes of an approached power post, the end sections may come into butting engagement with the contact shoes with the consequent probability of damaging or destroying them. The conductor rails 3, exclusive of the tapered end sections 17, may have a typical length of for example 35 to 40 feet. The contact shoes of the power post are of course fed from a main feeder line which may be installed underground with vertically extending risers connecting the feeder lines with each of the power posts. It is of course at once apparent that the cost of installing such a feeder line between posts is much less than in a conventional ground level system where heavy current conductor rails are employed.

Turn now to a consideration of FIGURE 3 which illustrates a typical embodiment of a power post. The power post, generally designated as 5 includes a base member 18 which may typically be made of concrete, and supported thereon a two part housing 19 and 20. The housing part 19 is fastened to the base portion 18 in some convenient manner, as for example by the bolts 21, and also acts as the supporting structure for the contact shoes 9, 10, 11, and 12. Each of the contact shoes is stood off of the housing section 19 by an assembly comprising a deflectable support member and a pair of insulating standoffs, for example the contact shoe 12 is connected to the deflectable member 22 which is in turn mounted to a plate 23 physically secured to the housing portion 19 by the insulating standoffs 24. The deflectable mounting member 22 is provided to allow the contact shoe 12 a certain degree of vertical travel because the rails 3 are subject to a certain degree of vertical and horizontal motion due to the movement of the wheeled vehicle 2 upon which they are mounted. If such motion were not allowed for, the standoff insulators 24, which may typically be of porcelain, would be subject to great mechanical stresses and consequent probable failure. The contact shoes themselves may be formed of for example cast iron, bronze, metal graphite, or sintered metals, particular shoe materials being applicable to particular installations. The rails 3 which engage the contact shoes may typically be made of steel, copper, or aluminum. The housing portion 20 which is illustrated in FIGURE 3 is removable from its interlocking position with the housing portion 19 so that access may be had to the inside of the power post which contains active electrical elements of the distribution system. Finally, each of the contact shoes 9, 10, 11, and 12, is electrically energizable from the active circuits inside of the power post by means of a connecting cable, as for example cable 25, which connects the contact shoe 12 to the internal power post circuitry.

Figure 4A:
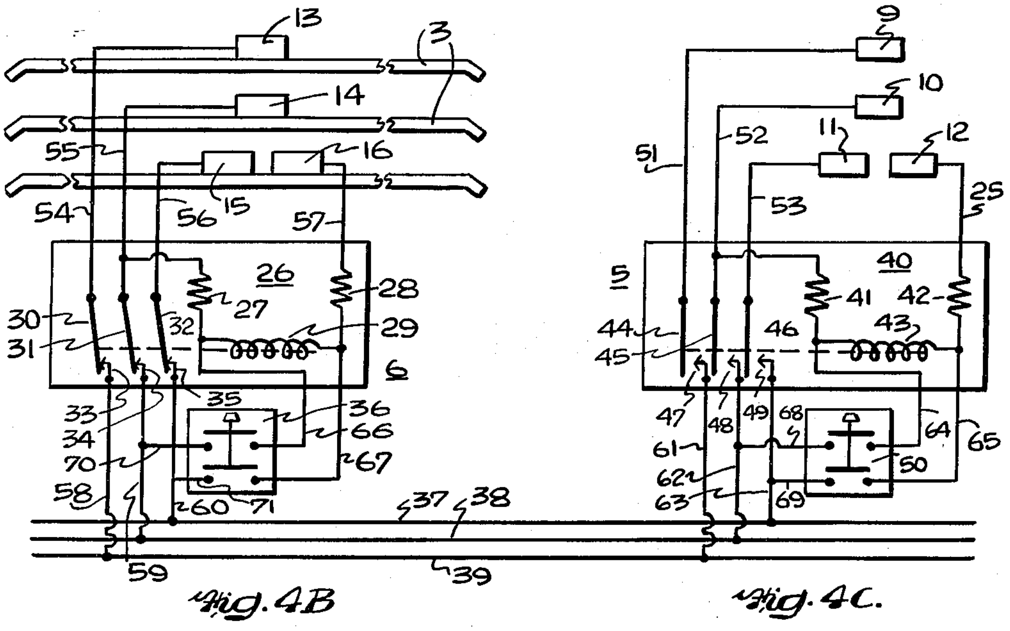

Understanding now the general method of operation of the system and the mechanical features employed therein turn now to a consideration of FIGURES 4A through 4E from which may be had an understanding of the electrical features embodied in my invention by virtue of which the high degree of safety aforementioned will become clear. FIGURE 4A shows the internal circuitry of the power posts 5 and 6 which have been formerly alluded to, while FIGURES 4B through 4E show in representational form the exteriors of these power posts in combination with the utility mounted conductor rails 3 in various conditions of engagement with these power posts. The electrical operation of the power posts 5 and 6 will first be described in connection with FIGURE 4A, and will then be followed by a functional description of the electrical operation of these posts as determined by the condition of engagement with the conductor rails 3, as illustrated in FIGURES 4B through 4E.

Consider now the FIGURE 4A wherein the electrical circuits of the power posts 5 and 6 are shown in schematic form. Examining first the diagram of the power post 5, which is the right-hand circuit shown in FIGURE 4A, it will be seen that the power contact shoes 9, 10, and 11, are each connected to a single pole 44, 45, and 46, of a three pole single throw electrical contactor by the cables 51, 52, and 53, respectively. The contacts 47, 48, and 49, of the three pole single throw contactor are respectively connected to a three phase power line feeder by the conductors 61, 62, and 63. The poles 44, 45, and 46, of the electrical contactor may be brought into engagement with the contacts 47, 48, and 49, by the magnetic action of the coil 43 when the latter is electrically energized, the poles of the contactor being mechanically linked to a plunger (not shown) which is acted upon by the magnetic field of the coil 43 when energized. One end of the coil 43 is connected to the conductor 52 by resistor 41 and it is also connected to one contact of a normally open switch 50 by a conductor 64. The other terminal of the coil 43 is connected to the control contact shoe 12 by a resistor 42 and conductor 25 and is also connected to a second contact of the normally open switch 50 by a conductor 65. When the normally opened switch 50 is closed, an electrical circuit is completed between the conductors 64 and 62 by conductor 68, and conductor 65 is electrically connected to conductor 63 by the conductor 69.

It will be observed that the poles of the contactor 44, 45, and 46, are in a normally opened condition and that therefore the potential present on feeder lines 37, 38, and 39, and thereby also present at the contacts 47, 48, and 49, is isolated from the contact shoes 9, 10, and 11, so that personnel who may come in contact with these shoes are in no danger of receiving a shock. As will be seen, subsequently, the contact shoes 9, 10, and 11, are deenergized because they are not engaged by the rails 3 which may be seen to the left in engagement with the contact shoes of the power post 6. During normal operations, only the elements of the contactor 40 are employed, and operation thereof is automatically accomplished. The normally open reset switch 50 is used only to reactivate the system subsequent to a power shut down, this switch being mounted inside the power post so that personnel do not have ready access to it. Referring now to the left-hand circuit of FIGURE 4A, that is the circuit of power post 6, it will be observed that there is a one-to-one correspondence between the elements shown thereat and corresponding elements in the right-hand circuit, or that of the power post 5, different reference numerals of course being employed in order to distinguish elements of power post 6 from those of power post 5.

Assume that as shown in the circuit of the power post 6 the conductor rails 3 mounted on a utility (not shown) are in engagement with the contact shoes 13, 14, 15, and 16, and that the contact shoes are therefore energized from the feeder lines 37, 38, and 39, by the interconnecting circuitry comprising the conductors 58, 59, and 60, the contacts and poles of the contactor 26, and the conductors 54, 55, and 56. Energizing current for the contactor coil 29 is supplied from the power feeder lines 37 and 38 in the following fashion. Current flows from the feeder line 37 through conductor 60 contact 35 and pole 32 of the contactor 26, over conductor 56 to the contact shoe 15, through the lower rail 3 to contact shoe 16 and thence over conductor 57 through resistor 28, coil 29, resistor 27, to conductor 55, thence through pole 31 and contact 34 of the contactor 26 and down to feeder line 38 via conductor 59. Thus, it is seen that contactor coil 29 when so energized holds the poles 30, 31, and 32, of the contactor 26 in electrical engagement with the contacts 33, 34, and 35, and allows power to be drawn from the feeder lines 37, 38, and 39, and delivered to a utility which is electrically connected to the rails 3. It will be further observed that the aforedescribed energizing circuit for the contactor coil 29, which is actually in the nature of a holding current circuit, requires the bridging action of the lower rail 3 between the contact shoes 15 and 16 to maintain continuity of the holding current circuit. It is clear, that if the lower rail 3 were not in such bridging engagement with the contact shoes 15 and 16 the holding current circuit would be broken with the consequent deenergization of the contactor coil 29 and the disengagement of the poles 30, 31, and 32, of contactor 26 from their associated contacts 33, 34, and 35, thereby breaking the circuit continuity from the feeder lines 37, 38, and 39, to the contact power shoes 13, 14, and 15, with the consequent deenergization of the utility. The manner of automatic deenergization of a power post when the contact shoes thereof become disengaged from the conductor rails 3 should now become apparent.

Assume for the moment that power to the feeder lines 37, 38, and 39, has been interrupted for one reason or another, and that consequently the holding current circuit for the contactor coil 29 has been deenergized. The contactor poles 30, 31, and 32, will therefore disengage from their respective contacts 33, 34, and 35, even though the rails 3 remain in contacting engagement with the contact shoes 13, 14, 15, and 16, as illustrated. When power is restored to the feeder lines 37, 38, and 39, there will of course be no automatic closure of the circuits of the contactor 26, and therefore, some means for reenergization of the system must be provided. Such provision is incorporated in the use of the normally open switch 36. Since the feeder lines 37, 38, and 39, are reactivated, single phase potential appears between lines 70 and 71 which are connected to one side of the switch 36. Maintenance personnel may now momentarily close the switch 36 thereby applying the single phase potential to the conductors 66 and 67 and thereby completing an electrical circuit through the contactor coil 29. Contactor coil 29 which is thus reenergized picks up the contactor poles and causes them to reengage their associated contacts, thereby reestablishing the electrical continuity between the contact shoes 13, 14, 15, and 16, and the power feeder lines 37, 38, and 39. At the same time, the holding current circuit previously described is also reestablished and the contactor coil 29 is maintained in its energized state, and the reset switch 36 may be released without causing the contactor poles to drop out of engagement with the contacts.

The presence of the resistors 27 and 28 in the holding current circuit of the contactor coil 29 is required to prevent burn out of the contacts of the normally open switch 36 during a reset operation as just described. If these resistors were not present and the switch 36 were closed during a reset operation, an electrical circuit would be established over conductor 66 to conductor 55 and thence to contact power shoe 14 and one side of the load electrically connected to the middle rail 3, through the load to contact power shoe 15, through the lower conductor rail 3 to the control contact shoe 16 over conductor 57 to conductor 67. If now, the utility load impedance were on the order of ½ to 1 ohm and the single phase voltage were on the order of 440 volts, both of which are typical, a current of 400 to 800 amperes would flow across the contacts of the switch 36. Welding of the switch contact would occur and the switch would be destroyed. To avoid such an occurrence, the current limiting resistors 27 and 28 are incorporated to limit the current during a reset operation to a value which can be easily handled by the contacts of the switch 36. In a 440 volt system the resistors 27 and 28 may be chosen to provide a drop of approximately 110 volts each when the holding current circuit is energized, thereby requiring that the contactor coil 29 be able to operate on 220 volts. During the reset operation, of course, the full 440 volts will be applied across the contactor 29 via the reset switch, but since this is only a momentary condition well-known coil design methods permit the design of the contactor coil 29 in such a way that destruction thereof does not occur.

Before turning to a consideration of FIGURES 4B through 4E, return to the circuit of the power post 5 shown at the right-hand side of FIGURE 4A. If in the circuit of the power post 5, as shown, the reset switch 50 were closed with the conductor rails 3 not in engagement with the contact shoes 9, 10, 11, and 12, it will be appreciated that the contactor coil 43 would be energized in identically the same fashion as that already described in connection with the circuit of the power post 6. However, the nonengagement of the conductor rails 3 with the contact shoes of power post 5 precludes the establishment of the holding current circuit since there is no bridging conductor between the contact shoes 11 and 12. Consequently, when the switch 50 is released the contactor coil 43 will deenergize and the poles 44, 45, and 46 ,of the contactor 40 will drop out of engagement with their respective contacts 47, 48, and 49. The requirement for bridging contact by the lower conductor rail 3 of the contact shoes 11 and 12 for maintaining the contact shoes of the power post in an energized state is thus further demonstrated.

Figure 4B:
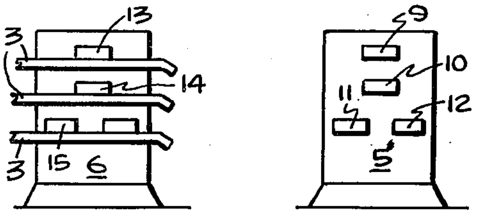
Figure 4C:
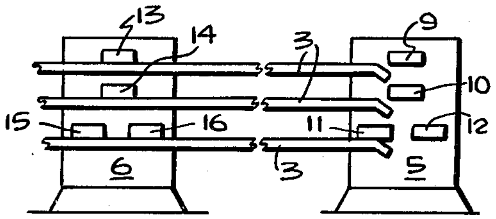

Turn to a consideration now of the FIGURES 4B through 4E in conjunction with the circuitry of FIGURE 4A. FIGURE 4B shows in representational form the conditions of physical engagement between the conductor rails 3 and a pair of adjacent power posts 5 and 6, whose electrical circuit conditions have just been described in connection with the circuits of FIGURE 4A. FIGURE 4B therefore illustrates the condition wherein the power post 5 is deenergized and power post 6 is energized and delivering power to a utility via the conductor rails 3. FIGURE 4C illustrates the condition where the wheeled vehicle 2 illustrated in FIGURE 1 has moved along its tracks and has approached the power post 5, the lower conductor rail 3 coming into engagement with the power shoe 11 but neither the center nor upper conductor rails 3 having engaged their respective contact shoes 10 and 9. Referring back now to FIGURE 4A it will be seen that the lower conductor rail 3 energizes the power shoe 11 on the power post 5 by virtue of the fact that the rails 3 are energized from the power post 6. Since however, bridging contact has not been established between the power shoe 11 and the control contact shoe 12 of the power post 5 the contactor coil 43 of the contactor 40 cannot be energized and the contactor poles 44, 45, and 46, remain disengaged from their associated contacts 47, 48, and 49. Thus the remaining power shoes 9 and 10 are not energized and power cannot be delivered to the load from the feeder lines 37, 38, and 39, by any of the power shoes on power post 5.

Figure 4D:
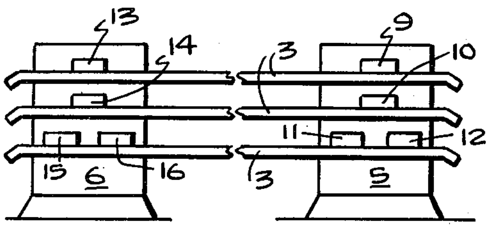

Examining now FIGURE 4D, it will be seen that the conductor rails 3 have continued their progress in a right-hand direction and are now in full bridging engagement with the contact shoes of both of the power posts 5 and 6. That is, the upper conductor rail 3 bridges between contact shoe 13 on power post 6 and contact shoe 9 on power post 5; the middle rail 3 bridges between contact shoe 14 on power post 6 and contact shoe 10 on power post 5; and the lower rail 3 bridges between the contact shoes 15 and 16 on power post 6 and the contact shoes 11 and 12 on power post 5. Returning again to the showing of FIGURE 4A and assuming that the conductor rails 3 are in bridging engagement in the manner illustrated in FIGURE 4D, it will be seen that the contactor 40 will be picked up in the following fashion. Current supplied from the feeder line 37 will flow over conductor 60 through contact 35 and pole 32 of the contactor 26 on power post 6, thence over conductor 56 contact shoe 15 and lower conductor rail 3 to contact shoes 11 and 12 on power post 5. From contact shoe 12 the current continues over conductor 25, through resistor 42, contactor coil 43, resistor 41, conductor 52, contact shoe 10, thence through the center conductor rail 3 to contact shoe 14 on power post 6 from which it continues through conductor 55 pole 31 and contact 34 of contactor 26, over conductor 59 to the feeder line 38. The contactor coil 43 being now energized, the poles 44, 45, and 46, of the contactor 40 are pulled into engagement with their respective contacts 47, 48, and 49, hence supplying power to the contact shoes 9, 10, 11, and 12, from the feeder lines 37, 38, and 39. Load current to the utility is now supplied in two parallel paths from the feeder circuits through each of the power posts 5 and 6 and their respective contact shoes. It should be observed at this time that electrical arcing at the contacts of the contactor 40 on power post 5 will not occur since the contactor 40 is not required to make the load circuit but merely to provide some of the load current once the circuit has been established. This results in a long, useful, and trouble free life for the contactors of the power posts.

Figure 4E:
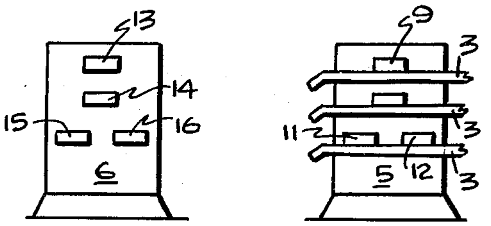

Referring now to FIGURE 4E, it is observed that the conductor rails 3 have continued their right-directed motion and are now completely disengaged from the contact shoes of the power post 6, remaining however in engagement with the contact shoes of the power post 5 which now supplies all the power to the load. The contact shoes 13, 14, 15, and 16, of the power post 6 are now in a completely deenergized state in accordance with the previously described deenergizing operation. Briefly reviewing however, the deenergization of the power post 6 contact shoes occurs because the bridging engagement between the contact shoes 15 and 16 previously provided by the lower conductor rail 3 has now been broken, and the holding current circuit for the contactor coil 29 on power post 6 has been broken. Thus the contactor coil 29 is deenergized and the poles of contactor 26 drop out of engagement with their associated contacts thereby isolating the contact shoes 13, 14, and 15, from the power feeder lines 37, 38, and 39. Here similarly no electrical arcing occurs at the contacts of the contactor 26 on power post 6 as they disengage because the contactor is not required to break the load circuit, the load being still carried by the contactor 40 on the power post 5.

The power posts of a distributed contact power distribution system as described in connection with the showings of FIGURES 4A through 4E, while providing vastly improved safety conditions over conventional systems, yet are not completely suitable for all applications. Such a system as described is eminently suitable for applications where very high voltage power distribution is not required and where the danger of electrical leakage from the contactor contacts to the contactor poles is not a problem. In power distribution systems designed for distribution of voltages for example in excess of 440 volts, or in environments where conductive dusts may have access to the contactors themselves thus increasing the possibility of leak-over from the contacts to the poles of the contactor and hence creating the danger of at least partial energization of the power post contact shoes from the feeder lines, slight modification of the power post electrical system may be desirable. Such a showing is illustrated in FIGURES 5A through 5F and FIGURES 6 and 7 which illustrate some additional detail considerations. However, an understanding of the basic modification of the power post system may be completely had from examination of the FIGURES 5A through 5F to which consideration should now be directed. A comparison of FIGURE 5A with FIGURE 4A reveals the basic similarity of the two, certain differences of course being present. Firstly, it is seen that the contactor 208 in FIGURE 5A is a triple pole double throw arrangement rather than a triple pole single throw configuration as is that of contactor 40 in FIGURE 4A. The extra tacts 218, 219, and 220, when the contactor coil 209 is required so that the contactor poles 212, 213, and 214, are electrically grounded by engagement with the contacts 218, 219, and 220, when the contactor coil 208 is deenergized. This insures that electrical leak-over from the contacts 215, 216, and 217, cannot even partially energize the power contact shoes 201, 202, and 203, when the power post 200 is in a deenergized state. Furthermore, the normally open reset switch 221 of FIGURE 5A is also grounded when in its normally open position, also to preclude any possibility of shock hazard. Finally, it is seen that the power post 200 of FIGURE 5A has seven contact shoes 201 through 207 whereas the power post 5 of FIGURE 4A had merely four shoes, 9 through 12. On power post 200 the contact shoes 201, 202, and 203, are the power shoes and the contact shoes 204, 205, 206, and 207, are control shoes, the control shoes 204 and 205 being positioned on opposite sides of the power shoe 202 so that the conductor rails 3 must necessarily engage one of the control shoes before contacting the power shoe regardless of the direction of approach of the conductor rails. Similarly, the control shoes 206 and 207 are positioned on opposite sides of the power shoe 203. The foregoing comment regarding the differences between the power post 200 and the power post 5 is completely applicable to the power post 100 also shown in FIGURE 5A, the posts 100 and 200 being alike in every regard.

Basically the power posts of FIGURE 5A and FIGURE 4A operate in a similar fashion, the main distinction being that in the circuit of FIGURE 4A the holding current circuit for the contactor coils include a control shoe for example 12 and a power shoe for example 10, whereas in the circuit of FIGURE 5A the holding current circuit for the contactor coils has no connection with any of the power shoes whatever, but is completely operated through the control shoe circuits. The reason for such an arrangement will become clear as the operation of the circuit of FIGURE 5A is described hereinafter.

Consider first the case where the power post 100 is delivering energy to a load from the feeder lines 370, 380, and 390. Current is delivered from the feeder lines over the conductors 125, 126, 127, through the power contacts 115, 116, and 117, of the contactor 108, thence via the poles 112, 113, 114, and over conductors 122, 123, 124, to the power shoes 101, 102, and 103, and therefore to the conductor rails 3 and the load. The energization of the conductor rails 3 obviously energizes all of the control shoes 104 through 107, and hence holding current for the contactor coil 109 is supplied over the conductors 132 and 133 in series with the coil 109 and current limiting resistors 110 and 111. Should a power interruption take place at this time the feeder conductors 370, 380, and 390, would become deenergized with the consequent interruption of the holding current to the contactor coil 109, thereby causing the poles 112, 113, and 114, to drop out of engagement with their power contacts 115, 116, and 117, and to engage their grounding contacts 118, 119, and 120. When power is restored, in order to reenergize the load, the reset switch 121 must be momentarily closed. Single phase energy will then be delivered over the conductors 128 and 129 through the switch 121 to conductors 134 and 135 and hence through the contactor coil 109. The contactor 108 will thereby be picked up and the poles 112, 113, and 114, will reengage their power contacts 115, 116, and 117, thereby allowing power from the feeder lines 370, 380, and 390, to be delivered to the power shoes 101, 102, and 103, as before. The holding current circuit for the contactor coil 109 previously described is again energized and the normally open switch 121 may be released. The current limiting resistors 110 and 111 perform the same function in the same way as the resistors 27 and 28 in the circuit of 4A. Refer now to the FIGURES 5B through 5F in conjunction with the showing of FIGURE 5A for an understanding of the operation of this power post system as a utility is moved between any pair of adjacent posts.

FIGURE 5B illustrates in representational form the engagement of the contact shoes of the power post 100 by the conductor rails 3, and the nonengagement of the latter with the power post 200. The circuit conditions in this case are of course identically those portrayed by the schematically representation of FIGURE 5A. FIGURES 5C illustrates the condition where the conductor rails 3 have progressed in a right-directed fashion toward the power post 200 and the center and lower conductor rails 3 have come into engagement with the control shoes 204 and 206 on the post 200, although none of these power shoes 201, 202, or 203, have been as yet engaged by any of the conductor rails 3. Referring back now to the circuit diagram of FIGURE 5A with the conditions as just described for the showing of FIGURE 5C, it will be understood that the holding circuit current is established in the following way. Current from the feeder lines 370, 380, and 390, is supplied to the conductor rails 3 through the power post 100, and consequently when the center and lower conductor rails 3 come into engagement with the control shoes 204 and 206 single phase power flows through the control shoes and the conductors 230 and 231 to the conductors 232 and 233, and thence through resistors 210 and 211 and contactor coil 209. The contactor poles 212, 213, and 214, are therefore transferred from their ground contacts to their power contacts 215, 216, and 217, thereby ungrounding the power shoes 201, 202, and 203, and electrically connecting them to the feeder lines 370, 380, and 390, although at this time the power shoes supply no energy whatever to the load circuit. It will be appreciated that the same circuit operation would have occurred had the conductor rails 3 been approaching the power post 200 from the right instead of from the left, and in such case would have picked up the contactor 208 by virtue of engagement with the control shoes 205 and 207. It has now been demonstrated that the contactor 208 will cause the power shoes 201, 202, and 203, to be ungrounded and energized regardless of the direction of approach of the conductor rails 3, and what is most important, at a time before any of the conductor rails can possibly engage any of the power shoes. Such operation is mandatory, for otherwise the conductor rails 3 which are energized by an adjacent power post, for example the power post 100, would be short circuited to ground through the grounding contacts 218, 219, or 220, and result in complete deenergization of the system by causing the main feeder lines circuit breakers to open.

FIGURE 5D illustrates the condition where the conductor rails are in complete engagement with all of the contact shoes of both of the power posts 100 and 200 and corresponds operation-wise to that of FIGURE 4D. FIGURE 5E illustrates the continued motion of the conductor rails 3 toward the right and as having passed out of engagement with the power shoes 101, 102, and 103, of the power post 100, thus allowing the power post 200 to supply the entire current to the load. The condition here portrayed is analogous to that of FIGURE 5C, and the power shoes of the post 100 remain energized even though they are not supplying energy to the load.

Consider now FIGURE 5F which illustrates the entire load being supplied to the conductor rails 3 by the power post 200, the power shoes of the post 100 being in a completely deenergized and grounded condition. In this case, as the conductor rails 3 become completely disengaged from the control shoes 105 and 107 the holding current circuit for contactor coil 109 is broken, thereby causing the poles 112, 113, and 114, to disengage from their power contacts and to ground the power shoes 101, 102, and 103, through the grounding contacts 118, 119, and 120.

FIGURE 6 illustrates a typical control circuit which must be utilized in conjunction with the system of FIGURE 5 and is required when a main power interruption on the feeder lines has occurred and the conductor rails 3 are in bridging engagement with a pair of adjacent power posts, as illustrated in the showing of FIGURE 5D. When the circuit is in the aforedescribed condition it will be appreciated that both of the contactors 108 and 208 in the showing of FIGURE 5A are deenergized and that therefore the power shoes of both of the power posts 100 and 200 are connected to ground through the grounding contacts of the respective contactors. When power is therefore restored to the feeder lines 370, 380, and 390, it is not possible to energize the system by closing either of the normally open switches 121 or 221 associated with the aforementioned power posts 100 and 200, because, assuming for the moment that the normally open switch 121 on the power post 100 were to be closed thus energizing the contactor coil 109 and causing the contactor poles 112, 113, and 114, to engage their energizing contacts 115, 116, and 117, it is immediately apparent that the power feeder lines would be short circuited to ground. The short circuit path may be traced from the feeder lines through the now energized post 100 to the conductor rails 3, thence through the power shoes 201, 202, and 203, on power post 200 along their associated conductors 222, 223, and 224, to the ground contacts 218, 219, and 220, on the contactor 208 through the poles 212, 213, and 214. The foregoing situation will occur regardless of which reset switch is closed, that is, switch 121 or switch 221. In order to avoid this difficulty an auxiliary control circuit of some type must be utilized, one possible circuit being shown in FIGURE 6. The scheme employed in utilizing the circuit of FIGURE 6 requires the breaking of electrical continuity between the left-hand halves of the conductor rails 3 and the right-hand halves. This is accomplished in FIGURE 6 by the insulating elements designated as 301, 302, and 303. These insulating elements are of sufficient length and dielectric strength as to completely electrically isolate the left-hand and right-hand sections of each of the conductor rails from each other. Each of the rail sections 3′ is connected via one of the conductors 327, 329, or 331, to a pole 306, 307, or 308, of a contactor 304. The corresponding rail section 3 is connected to a power contact 309, 310, or 311, by one of the conductors 326, 328, or 330, so that when the contactor coil 305 is energized, the poles 306, 307, and 308, are pulled into engagement with their respective power contacts 309, 310, and 311, thereby short circuiting the insulating elements 301, 302, and 303, and restoring electrical continuity to each of the top, center, and bottom, conductor rails 3—3′. The power contactor 304 must be mounted someplace on the wheeled vehicle which carries the conductor rail system as must also the transformer 318, the contactor 312, and the normally open switch 323.

It is now apparent that reenergization of the system after after a power shut down on the main feeder lines has occurred may be accomplished without encountering the short circuit problem previously described. The reenergization is accomplished in the following way, understanding of course that the occurrence of the power shut down deenergized the contactor 304 thus giving rise to circuit isolation between the rail sections 3 and their corresponding halves 3′. The specific function of the contactor 304 in this regard will be made clear hereinafter. Assume now that the normally open switch 121 on power post 100 is momentarily closed thereby energizing the contactor 108 and transferring power from the feeder lines 370, 380, and 390, to the power shoes 101, 102, and 103, and hence also to the holding current circuit associated with the contactor coil 109. At this point, the conductor rails sections 3 in the showing of FIGURE 6 are all energized but no short circuit can occur through the power post 200 since electrical isolation therefrom is maintained by the insulating elements 301, 302, and 303, in combination with the deenergized contactor 304. The reset switch 221 on power post 200 is now closed resulting in the energization of the power shoes of that post and all the rail sections 3′. All of the rail sections now being energized, single phase power is applied to the primary winding 319 of the transformer 318 from the center conductor rail 3 and the lower conductor rail 3′ via the conductors 324 and 325. Electrical potential consequently appears across the secondary winding 320 of the transformer 318 and therefore at the contacts 316 and 317 of the contactor 312 and on one side of the normally open switch 323. Closing of the normally open switch 323 enables single phase power to be applied from the transformer secondary winding 320 through the contacts 323 to the coil 305 of the contactor 304, and also to the coil 313 of the contactor 312. Energization of the contactor coil 305 pulls the poles 306, 307, and 308, into engagement with their associated power contacts 309, 310, and 311, thereby effecting the short circuit of the insulator elements 301, 302, and 303, and restoring electrical continuity to the rail system 3—3′. Energization of the contactor coil 313 pulls the poles 314 and 315 into engagement with their associated contacts 316 and 317, thus allowing single phase power to be delivered from the secondary winding 320 of the transformer 318 to the contactor coils 305 and 313 in a circuit arrangement which by-passes the normally open switch 323. The switch 323, therefore, may be released and the contactor coils 305 and 313 will remain energized. The transformer 318 is illustrated in the circuit of FIGURE 6 to make provision for systems wherein very high voltages, for example on the order of 4,160 volts, may be emfore applying potential to the switch 323 or the conployed. Such a system requires a voltage step down before applying potential to the switch 323 or the contactor coils 305 and 313. If a low voltage system were used, the transformer 318 could be dispensed with and the conductors 324 and 325 could be connected directly to the switch 323 and the contacts 316 and 317 of the contactor 312.

In energizing the system according to the foregoing discussion it should now be clear that the individual power posts must first each be energized before energizing the contactor 304.

An alternative method for energizing the contactor coil 305 would be to insert a battery 332, or other independent current source, between the left-hand contacts of the switch 323 as viewed in FIGURE 6 (battery shown dotted). In this case, of course, the coil 305 may have to be responsive to direct current, and the transformer 318, together with its associated wiring may be dispensed with. If desired, a locking type switch may be used in place of the normally open switch 323, in which case the relay 312 may also be eliminated. It must be kept in mind, however, that the use of this alternative method of energizing the coil 305 does not avoid the possibility of post-to-post short-circuiting, and care must be exercised that each of the bridged power posts be first activated before the coil 305 is energized.

The circuit of FIGURE 7 is similar that of FIGURE 5A excepting that the reset switch 121 of the latter figure has been replaced by somewhat more elaborate circuitry. This more elaborate circuitry is required in high voltage applications where a simple switch of the nature of switch 121 of FIGURE 5A would be inadequate.

Since the circuits of FIGURE 5A and FIGURE 7 are similar, reference numerals associated with FIGURE 5A have been duplicated on FIGURE 7 wherever identity of elements occurs. Attention should be addressed now exclusively to FIGURE 7 and reference numerals identified hereinafter are in all cases identified therewith unless otherwise indicated. Assume now that the feeder lines 370, 380, and 390, are all energized but that the power post is deenergized, as shown. Single phase power is applied to the primary winding 141 of a transformer 140 via the conductors 126, 127, 128, and 129. This voltage, which may be in the 4,000 volt range is stepped down through the transformer 140, and the much lower potential appearing across the secondary winding 142 is applied to one side of a normally open double pole switch 150 via the conductors 157 and 158. This same potential lights a lamp 159 through a closed electrical circuit including the secondary winding 142 of the transformer 140, the conductor 169, the pole 145, and contact 147 of a relay 143, the lamp 159, and the conductor 168. The lamp 159 may be so mounted that it is visible from the outside of the power post, and for example may be of green color to indicate that the power post is in a deenergized state. Closure of the normally open switch 150 transmits the stepped down voltage from secondary winding 142 of transformer 140 to a pair of non-locking contacts 157 and 158 of a restoring type double pole switch 151. While holding the switch 150 closed, for example with the left-hand, the switch 151 must also be depressed, for example with the right-hand, in order that the stepped down voltage may be transmitted through both switches to the conductors 165 and 166. The potential on conductors 165 and 166 is transmitted to contactor coil 109 via the conductors 161 and 162, and also to the relay coil 144 via conductors 163 and 164. The coils 109 and 144 are thus energized, thereby causing the contactor poles 112, 113, and 114, to transfer to their power contacts 115, 116, and 117, and the poles 145, and 146, of the relay 143 to respectively engage the contacts 148 and 149. As a consequence, the conductor rails 3 are energized from the power feeder lines 370, 380, and 390, in the now well-known manner. Moreover, when the pole 145 of the relay 143 transfers from its contact 147 to the contact 148, the lamp 159 will be extinguished and the lamp 160 will become lit. The lamp 160 may be similarly mounted as the lamp 159 but may for example be of a red color to indicate that the power post is now in an energized and therefore dangerous condition. The significance of the pole 146 and contact 149 of the relay 143 in conjunction with the element 172 and the pole 138 and contact 139 of the contactor 108 will be subsequently discussed. Upon energization of the coils 109 of contactor 108 and 144 of relay 143, the switches 150 and 151 may be released and holding current for the coils 109 and 144 is supplied in the following manner.

Since all of the contact shoes of the power post are now in energized condition by virtue of the presence of the conductor rails 3, single phase voltage is applied to the primary winding 153 of a transformer 152 via conductors 132 and 133. Transformer 152 may be of the same type as previously discussed transformer 140 and hence a stepped down voltage will appear at the secondary winding 154. Assuming for the moment that the switch 151 had not as yet been released, the holding current path from the secondary winding 154 is through resistors 155 and 156 to conductors 165 and 166 and thence to the coils 109 and 144 over the conductors 161, 162, 163, and 164. When now the switch 151 is released and returns to its restored condition the holding current circuit from the secondary winding 154 is now seen to be through the restored contacts of switch 151 to conductors 165 and 166 and thence as previously described. The utilization of two switches 150 and 151 requiring the use of both the left and the right-hand by maintenance personnel is dictated by safety considerations inasmuch as extremely high voltages are present inside the power posts. Should the high voltage hazard now be present it is apparent that the switch 150 may be dispensed with and the conductors 167 and 168 may be taken directly to the contacts 157 and 158 of the switch 151. The presence of the current limiting resistors 155 and 156 is required as earlier described in connection with FIGURES 4A and 5A. That is, upon initial energization of the system by the closing of the switches 150 and 151, excessively large currents may be drawn through the contacts of these switches over the conductors 165 and 166 to the secondary winding 154 of the transformer 152, through the transformer and to the load connected to the conductor rails 3. The current limiting resistors 155 and 156 reduce this current to a magnitude which may be handled by the contacts of the switches 151 and 150, and the windings of the transformer 152.

Finally, understanding now the operation of the high voltage reset system, attention should be directed to the remaining feature of the showing of FIGURE 7, which is a safety circuit. The safety circuit comprises a source of current, for example the battery 173, whose positive terminal is shown connected to an auxiliary pole 138 of the contactor 108 and also to the conductor 170 and the pole 146 of the relay 143; the contact 139 associated with the auxiliary pole 138 is connected to a conductor 171 which in turn connects to the contact 149 of the relay 143 and to a circuit breaker trip relay 172, the latter controlling the 3 phase feeder lines circuit breaker 174. The battery 173 is shown only for purposes of illustration and any convenient current source may be used, for example an alternating current source could just as readily be utilized. The purpose of the safety circuit is to cause the circuit breaker 174 to deenergize the feeder lines in the event that a contactor at a power post fails to drop out when its coil is deenergized. For example, if upon deenergization of the contactor coil 109 the poles 112, 113, and 114, did not transfer to their grounding contacts, but rather remained in engagement with their power contacts 115, 116, and 117, the power post 100 would remain in an energized and hence highly dangerous condition. In such an event it is desired to shut the system down until the faulty contactor is repaired or replaced.

Assume first that the power post 100 is in a deenergized state and therefore the contactor 108 is in the condition illustrated, the pole 138 being in engagement with the contact 139; the relay 143 is also deenergized and the pole 146 is not engaging its contact 149. In this condition, current flows from the current source 173 through the pole 138 and contact 139 of the contactor 108, along conductor 171 to the trip relay 172, holding the trip relay energized and allowing the circuit breaker 174 to transfer power to the feeder lines 370, 380, and 390. When now, the power post is subsequently energized the pole 138 is disengaged from its contact 139 but the pole 146 is brought into engagement with its contact 149 and current continuity is thereby maintained from the current source 173 to the trip relay 172. Should now, upon disengagement of the conductor rails 3 from all the contact shoes of the power post 100, the poles 112, 113, 114, and 138, not return to the normally deenergized position of the contactor, the contact shoes of the power post will remain energized with high voltage. The relay coil 144, however, has been deenergized because the holding current circuit has been broken and consequently the pole 146 will drop out of engagement with its contact 149. The current continuity of the safety circuit is now disrupted because current cannot flow through the open pole circuit 138 to conductor 171, nor can it flow through conductor 170 and the open pole circuit of 146. This interruption of current to the trip relay 172 causes it to drop out and trip the circuit breaker 174, thereby deenergizing the feeder lines 370, 380, and 390. When the faulty contractor has been located and the fault has been remedied the safety circuit continuity will be re-established and the trip relay 172 will be reenergized, thereby allowing the circuit breaker 174 to reenergize the feeder lines 370, 380, and 390.

Although my invention has been described and illustrated with reference to a 3 phase alternating current system, it is equally well applicable to single phase, 2 phase, and other multiple phase alternating current systems, and also obviously to a direct current system. The embodiments of FIGURES 4A, 5A, and 7, may be readily converted to single phase operation by merely eliminating the power shoes 13 and 101 respectively together with their associated conductors, contacts, and the upper conductor rail 3. Two-phase operation on the other hand requires the addition of an additional power shoe and conductor rail 3, since 2 phase systems are operated with a 4 wire distribution arrangement. The modification to single phase circuitry also satisfies the requirements of a direct current system.

While I have described my invention in connection with the particular embodiment illustrated in the appended drawings, many modifications and variations of my invention will suggest themselves to those normally skilled in the art without departing from the scope or spirit of my invention.

What is claimed as new and useful is:

1. In a distributed contact power system utilizing a plurality of spaced power posts with contact shoes mounted thereon for delivering electrical power to a load connected to a plurality of movable collector rails adapted to engage the contact shoes, a power post comprising, at least first and second electrically independent power contact shoes, actuatable means including the poles and contacts of an electrical power contactor for coupling each of said power shoes to a power feeder system, and control means including an electrically energizable coil magnetically coupled to the said poles of the electrical power contactor for controlling the actuation of said actuatable means and being thereby adapted to control the delivery of electrical power to said power shoes from the power feeder system, said control means further including a control contact shoe electrically coupled to one end of said coil, said control contact shoe and said first power contact shoe being positioned relative to one another so that one of said movable collector rails is enabled to contact both of said last mentioned shoes at the same time.

2. In a distributed contact power system utilizing a plurality of spaced power posts with contact shoes mounted thereon for delivering electrical power to a load connected to a plurality of movable collector rails adapted to engage the contact shoes, a power post comprising, at least first and second electrically independent power contact shoes, actuatable means including the poles and contacts of an electrical power contactor for coupling each of said power shoes to a power feeder system, and control means including an electrically energizable coil magnetically coupled to the said poles of the electrical power contactor for controlling the actuation of said actuatable means and being thereby adapted to control the delivery of electrical power to said power shoes from the power feeder system, said control means further including a control contact shoe electrically coupled to one end of said coil, said control contact shoe and said first power contact shoe being positioned relative to one another so that one of said movable collector rails is enabled to contact both of said last mentioned shoes at the same time, the other end of said coil being electrically coupled to the second one of said power shoes, said control shoe and said second one of said power shoes being positioned for engagement with different ones of a plurality of movable load-connected collector rails for establishing electrical circuit continuity through said coil, said coil becoming automatically energized when said collector rails are energized and brought into engagement with said control shoe and said second one of said power shoes, and said coil becoming automatically deenergized when said collector rails disengage from either said control shoe or said second one of said power shoes.

3. In a distributed contact power system utilizing a plurality of spaced power posts with contact shoes mounted thereon for delivering electrical power to a load connected to a plurality of movable collector rails adapted to engage the contact shoes, a power post comprising, at least first and second electrically independent power contact shoes, actuatable means including the poles and contacts of an electrical power contactor for coupling each of said power shoes to a power feeder system, and control means including an electrically energizable coil magnetically coupled to the said poles of the electrical power contactor for controlling the actuation of said actuatable means and being thereby adapted to control the delivery of electrical power to said power shoes from the power feeder system, said control means further including at least two independent control contact shoes, a first one of said control shoes being electrically coupled to one end of said coil, and the second one of said control shoes being electrically coupled to the other end of said coil, said first and second control shoes being positioned for engagement with different ones of a plurality of movable load-connected collector rails for establishing electrical circuit continuity through said coil, said coil becoming automatically energized when said collector rails are energized and brought into engagement with both of said control shoes, and said coil becoming automatically deenergized when said collector rails disengage from either of said control shoes.

4. The power post according to claim 3 wherein said control means further includes voltage-reducing means having input and output terminals, said input terminals being adapted for coupling to the power feeder system, and said output terminals being adapted for coupling to said coil.

5. The power post according to claim 4 wherein said voltage-reducing means comprises first and second independent means, said first means being adapted for direct coupling to the power feeder system and said second means being adapted for coupling to the power feeder system through said control shoes and said collector rails.

6. The power post according to claim 4 further including means coupled to said coil and to the said poles of the electrical power contactor and operative to interrupt the transfer of voltage to the said power contact shoes from the power feeder system when said coil loses actuation control of the said poles of the electrical power contactor.

7. A distributed contact power system including a plurality of spaced identical power posts with contact shoes mounted thereon, a plurality of movable current-collector rails and means for supporting said movable rails for motion from one post to another, said rails being adapted to engage the contact shoes of said power posts and being of sufficient length to engage corresponding contact shoes on first and second adjacent power posts, each of said rails having a first and a second section and means for electrically isolating said first and second sections from each other.

8. The power system according to claim 7 including actuatable means for by-passing said isolating means and establishing electrical continuity between the said first and second sections of each current-collector rail, and control means coupled to said actuatable means for controlling the actuation thereof.

9. The power system according to claim 8 wherein said actuatable means includes the poles and contacts of an electrical power contactor, and said control means includes an electrically energizable coil magnetically coupled to the said poles of the electrical power contactor and further includes a coil energizing circuit.

References Cited in the file of this patent

UNITED STATES PATENTS

| | | |
|---|---|---|
| 596,182 | Potter | Dec. 28, 1897 |
| 1,511,383 | Wagner | Oct. 14, 1924 |
| 2,778,890 | Storsand | Jan. 22, 1957 |